US012058510B2

(12) United States Patent
Elby et al.

(10) Patent No.: US 12,058,510 B2
(45) Date of Patent: Aug. 6, 2024

(54) MAPPING AUDIO TO VISUAL IMAGES ON A DISPLAY DEVICE HAVING A CURVED SCREEN

(71) Applicant: Sphere Entertainment Group, LLC, New York, NY (US)

(72) Inventors: Stuart Elby, Westport, CT (US); Erik Hockman, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 764 days.

(21) Appl. No.: 16/678,792

(22) Filed: Nov. 8, 2019

(65) Prior Publication Data
US 2021/0120356 A1    Apr. 22, 2021

Related U.S. Application Data

(60) Provisional application No. 62/923,215, filed on Oct. 18, 2019.

(51) Int. Cl.
*H04S 7/00* (2006.01)
*G06F 3/14* (2006.01)
(Continued)

(52) U.S. Cl.
CPC .............. *H04S 7/30* (2013.01); *G06F 3/1407* (2013.01); *G10K 15/12* (2013.01); *H04S 3/008* (2013.01); *H04S 2400/01* (2013.01)

(58) Field of Classification Search
None
See application file for complete search history.

(56) References Cited

U.S. PATENT DOCUMENTS

| 5,119,428 A | 6/1992 | Prinssen |
| 9,693,009 B2* | 6/2017 | Farrell ..................... H04N 5/77 |
| | (Continued) | |

FOREIGN PATENT DOCUMENTS

| EP | 2930671 A1 | 10/2015 |
| EP | 3052719 A2 | 8/2016 |
| WO | WO 2014132280 A2 | 9/2014 |

OTHER PUBLICATIONS

International Search Report and Written Opinion of the International Searching Authority directed to related International Patent Application No. PCT/US2020/056332, mailed May 2, 2021; 21 pages.

(Continued)

*Primary Examiner* — Aaron M Richer
(74) *Attorney, Agent, or Firm* — Sterne, Kessler, Goldstein & Fox P.L.L.C.

(57) ABSTRACT

Disclosed herein are system, method, and computer program product embodiments for accurately mapping audio to a visual image on a display device. An embodiment operates by, based on an identified virtual representation of the remote venue, modifying audio received at a local venue to produce a first and second modified audio. Thereafter, the first and second modified audio is correlated to a first and second portion of a prestored image. Afterward, the first and second portion of the prestored image is presented on a first and second portion of the display device's curved screen, and the first and second modified audio is provided on a first and second audio device, respectively, such that the first and second modified audio is provided to the first and second regions of the local venue synchronously with the first and second portions of audio.

21 Claims, 12 Drawing Sheets

(51) Int. Cl.
  *G10K 15/12* (2006.01)
  *H04S 3/00* (2006.01)

(56) References Cited

U.S. PATENT DOCUMENTS

| | | | |
|---|---|---|---|
| 10,754,511 B2* | 8/2020 | Birkbeck | H04N 21/8455 |
| 11,202,162 B2 | 12/2021 | Elby et al. | |
| 2002/0067835 A1 | 6/2002 | Vatter | |
| 2005/0210512 A1 | 9/2005 | Anderson, Jr. et al. | |
| 2009/0080632 A1* | 3/2009 | Zhang | H04M 3/568 |
| | | | 379/202.01 |
| 2010/0073468 A1* | 3/2010 | Kutner | E04H 3/22 |
| | | | 348/61 |
| 2010/0150359 A1 | 6/2010 | Knickrehm et al. | |
| 2013/0208903 A1 | 8/2013 | Ojala | |
| 2013/0321566 A1* | 12/2013 | Simonnet | G06T 15/08 |
| | | | 348/14.16 |
| 2015/0297949 A1* | 10/2015 | Aman | G06T 7/246 |
| | | | 348/157 |
| 2018/0227694 A1 | 8/2018 | King | |
| 2018/0335832 A1* | 11/2018 | Hardy | G06F 3/012 |
| 2019/0105568 A1 | 4/2019 | Platt et al. | |
| 2019/0387350 A1* | 12/2019 | Audfray | H04R 5/033 |
| 2021/0120358 A1 | 4/2021 | Elby et al. | |
| 2021/0400416 A1 | 12/2021 | Elby et al. | |
| 2024/0031761 A1 | 1/2024 | Elby et al. | |

OTHER PUBLICATIONS

International Search Report and Written Opinion of the International Searching Authority directed to related International Patent Application No. PCT/US2020/056336, mailed Aug. 21, 2018; 14 pages.

U.S. Appl. No. 16/678,811, "Synthesizing Audio of a Venue," to Elby et al., filed Nov. 8, 2019.

U.S. Appl. No. 16/678,792, "Mapping Audio to Visual Images on a Display Device Having a Curved Screen," to Elby et al., filed Nov. 8, 2019.

* cited by examiner

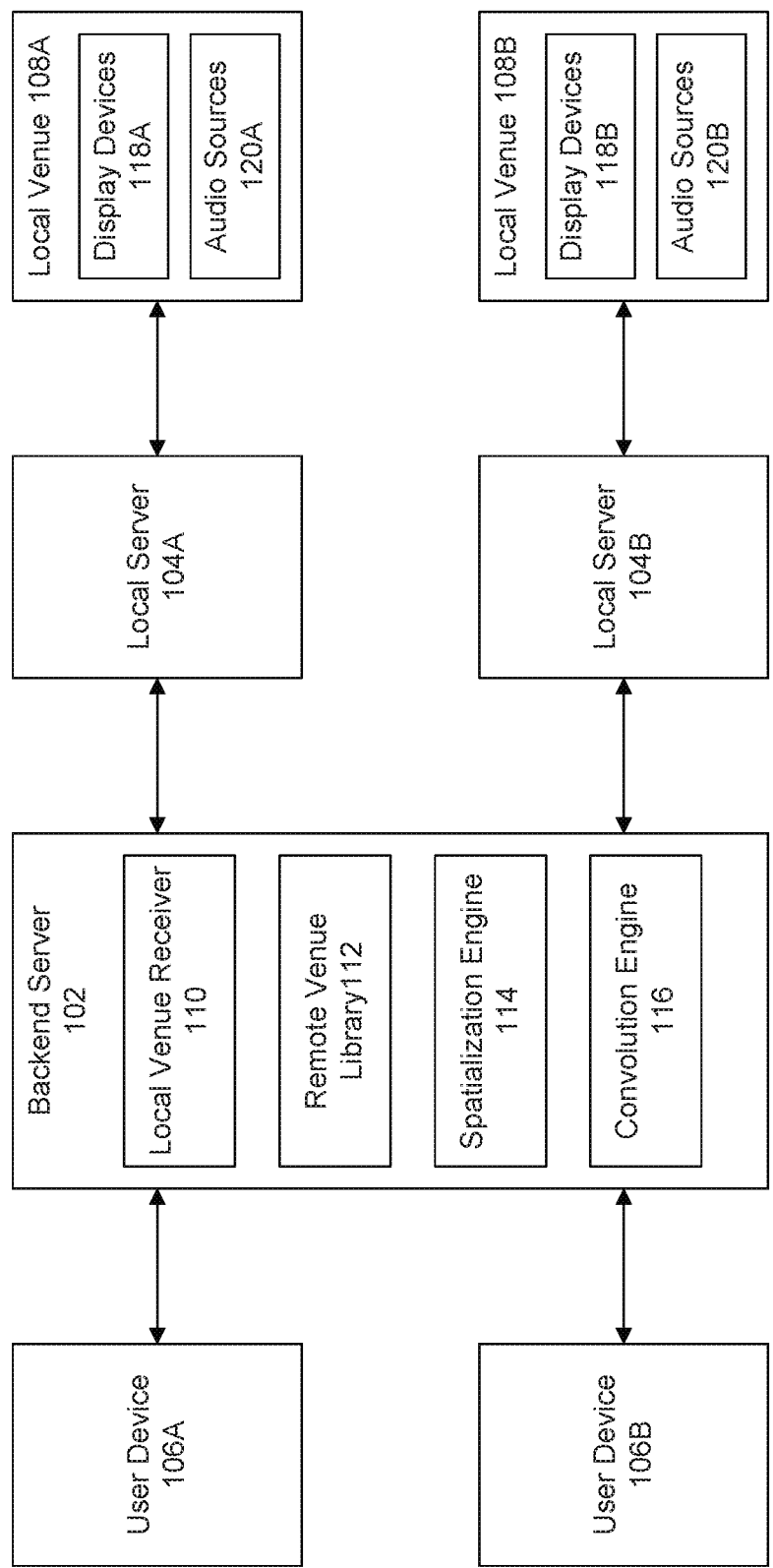

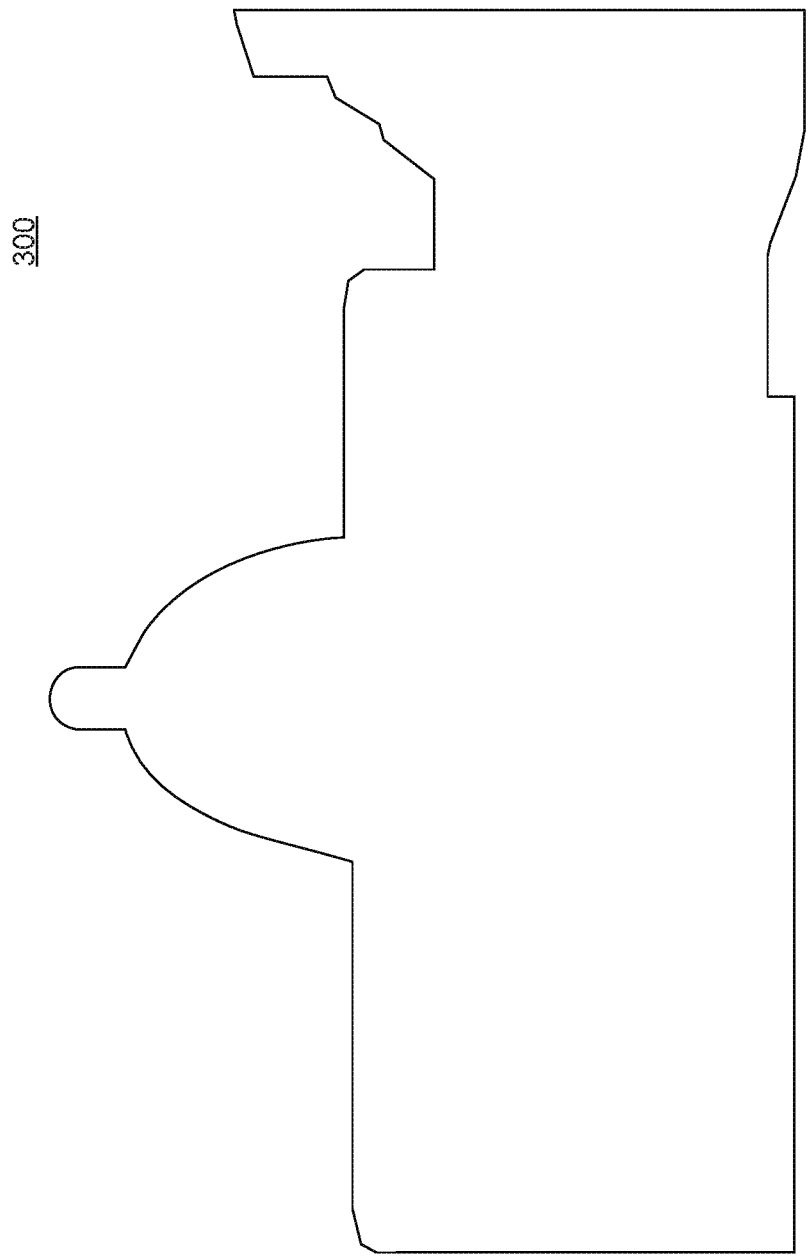

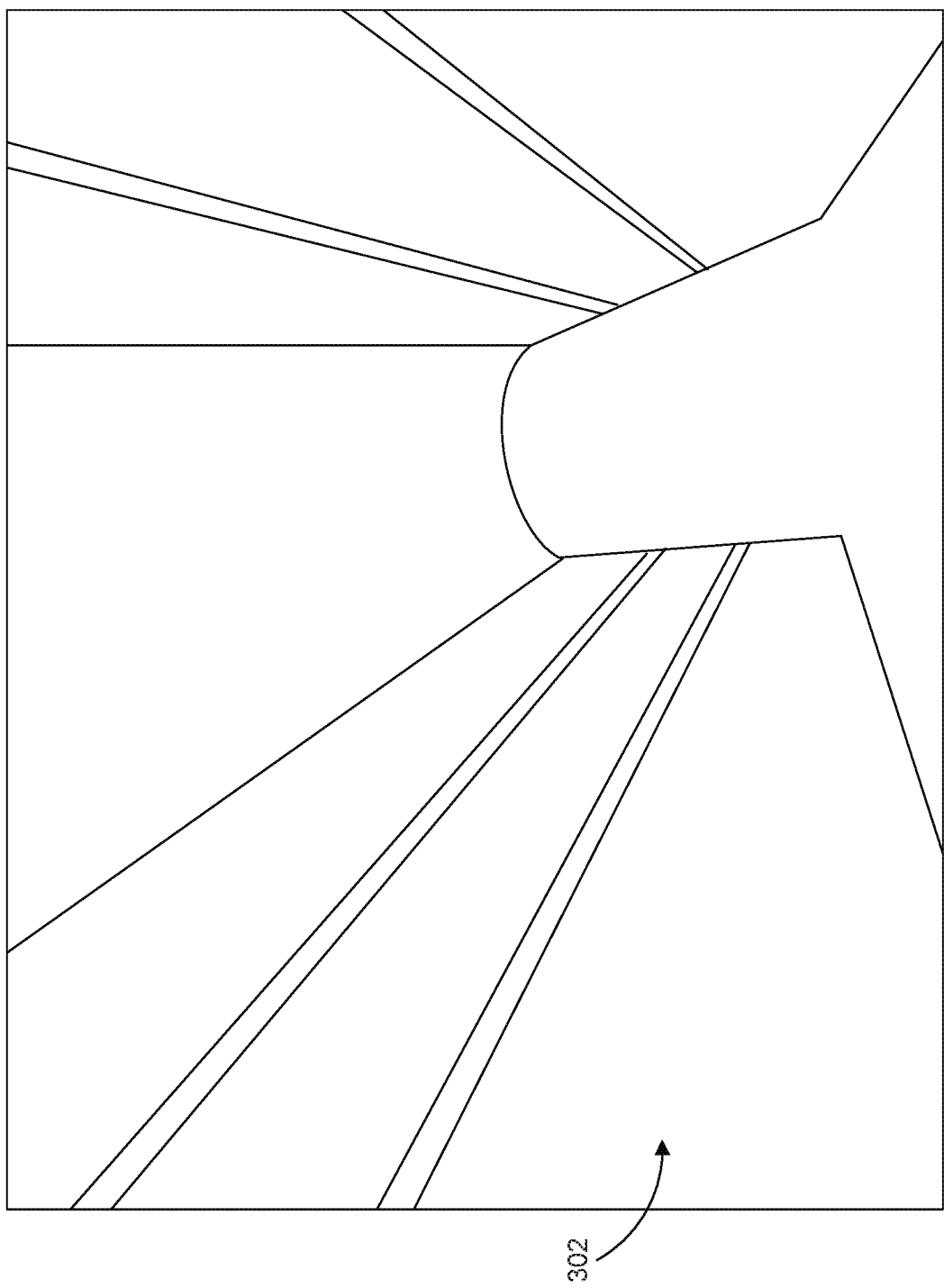

MAPPING AUDIO TO VISUAL IMAGES ON A DISPLAY DEVICE HAVING A CURVED SCREEN

CROSS-REFERENCE RELATED APPLICATION

This application claims priority to U.S. Provisional Application No. 62/923,215, filed on Oct. 18, 2019.

BACKGROUND

A given musical act (e.g., a singer such as Celine Dion or a band such as Green Day) will typically perform two or more times at the same venue in the same city. For example, each time Green Day returns to New York City, it may perform in Madison Square Garden. Moreover, a band such as Phish might perform for a series of consecutive days at the same venue, such as Madison Square Garden. Although such musical acts will often change the set list of songs played each night, fans might be less inclined to see the same act perform multiple times at the same venue. Rather, fans planning to see the same act perform multiple times might stay away from attending multiple performances at the same venue and might prefer to see the act play in different venues. Unfortunately, this might not be possible. Either because there are not multiple venues in the same city which can accommodate the act, or because traveling to different venues might be prohibitive for the fans. Instead, what is needed is a way for a musical act to perform multiple times at the same venue, but the performances to appear to fans as if they were being performed in multiple different venues.

BRIEF DESCRIPTION OF THE FIGURES

The accompanying drawings are incorporated herein and form a part of the specification.

FIG. 1 illustrates a block diagram of a system for providing a representation of a remote venue in a local venue, according to some embodiments.

FIGS. 3A-B illustrates an example remote venue capable of being represented in the local venue of FIG. 1, according to some embodiments.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 2A:
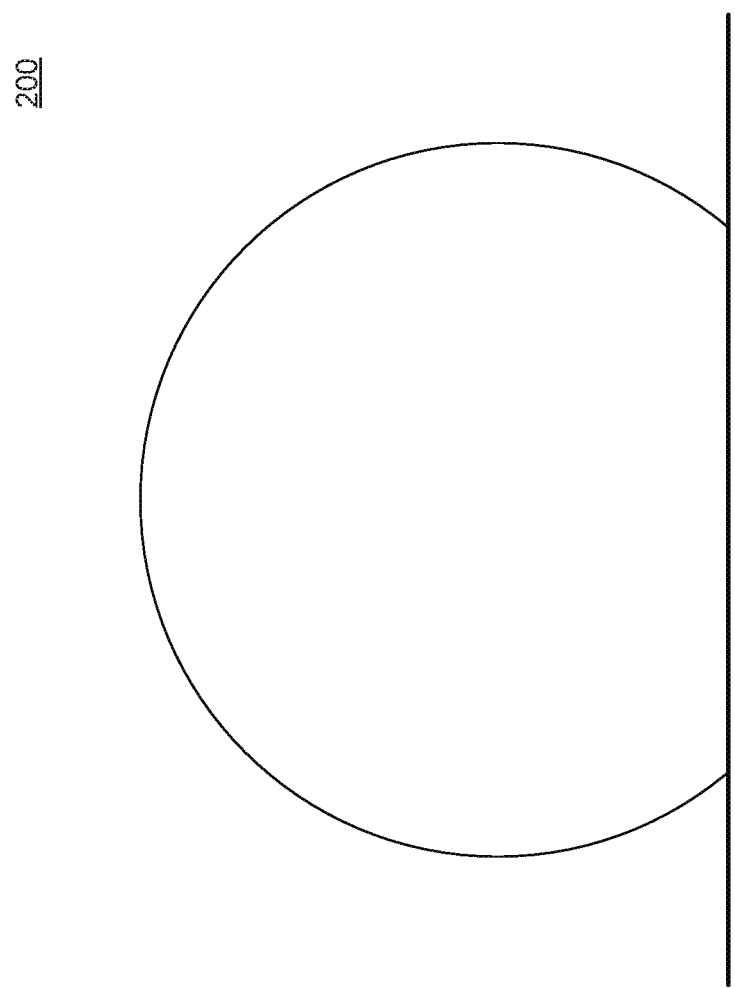
FIGS. 2A-B illustrate an example local venue of FIG. 1, according to some embodiments.

Provided herein are system, apparatus, device, method and/or computer program product embodiments, and/or combinations and sub-combinations thereof, for providing a virtual representation of a remote venue in a local venue.

The present disclosure is directed to permitting the selection of a remote venue to be replicated visually and acoustically in a local venue. For example, a performer may virtually perform a world tour in different cities at the same venue. As such, the performer may select to perform at Red Rocks one night and at St. John the Devine the following night. Thus, this disclosure enables continuously representing various remote venues in a local venue while providing audio and/or video true to the remote venues in the local venue.

The present disclosure incorporates by reference concurrently filed U.S. application Ser. No. 16/678,811, titled "Synthesizing Audio of a Venue," which features may be combined with those of the present disclosure for synchronously presenting audio of a remote venue with images on a three-dimensional display in a local venue.

FIG. 1 illustrates a system 100 for providing an audio and video representation of a remote venue in local venues 108A-B. System 100 includes backend server 102 in communication with local servers 104A-B and user devices 106A-B. As will be discussed in more detail below, backend server 102 creates a virtual representation of a remote venue for providing local venues 108A-B with a visual and audio representation of the remote venue. Backend server 102 sends the virtual representation of the remote venue to local servers 104A-B. Local servers 104A-B manage video and audio reproduction of the remote venue in the local venues 108A-B. In some embodiments, although not illustrated, backend server 102 and local servers 104A-B may be a single server that performs their combined functions.

Backend server 102 includes a local venue receiver 110, a remote venue library 112, a spatialization engine 114, and convolution engine 116. Local venue receiver 110 stores dimensions of an interior portion of the local venues 108A-B providing the audio presentation, a configuration and location of audio sources 120A-B in local venues 108A-B, a location of a stage (or where a performer typically performs) in local venues 108A-B, and/or a location of possible attendees (e.g., seats) in local venues 108A-B. As such, local venue receiver 110 may store a distance between audio sources 120A-B in the local venues 108A-B, a distance from each audio source 120A-B to the stage in the local venue 108A-B.

Figure 2B:
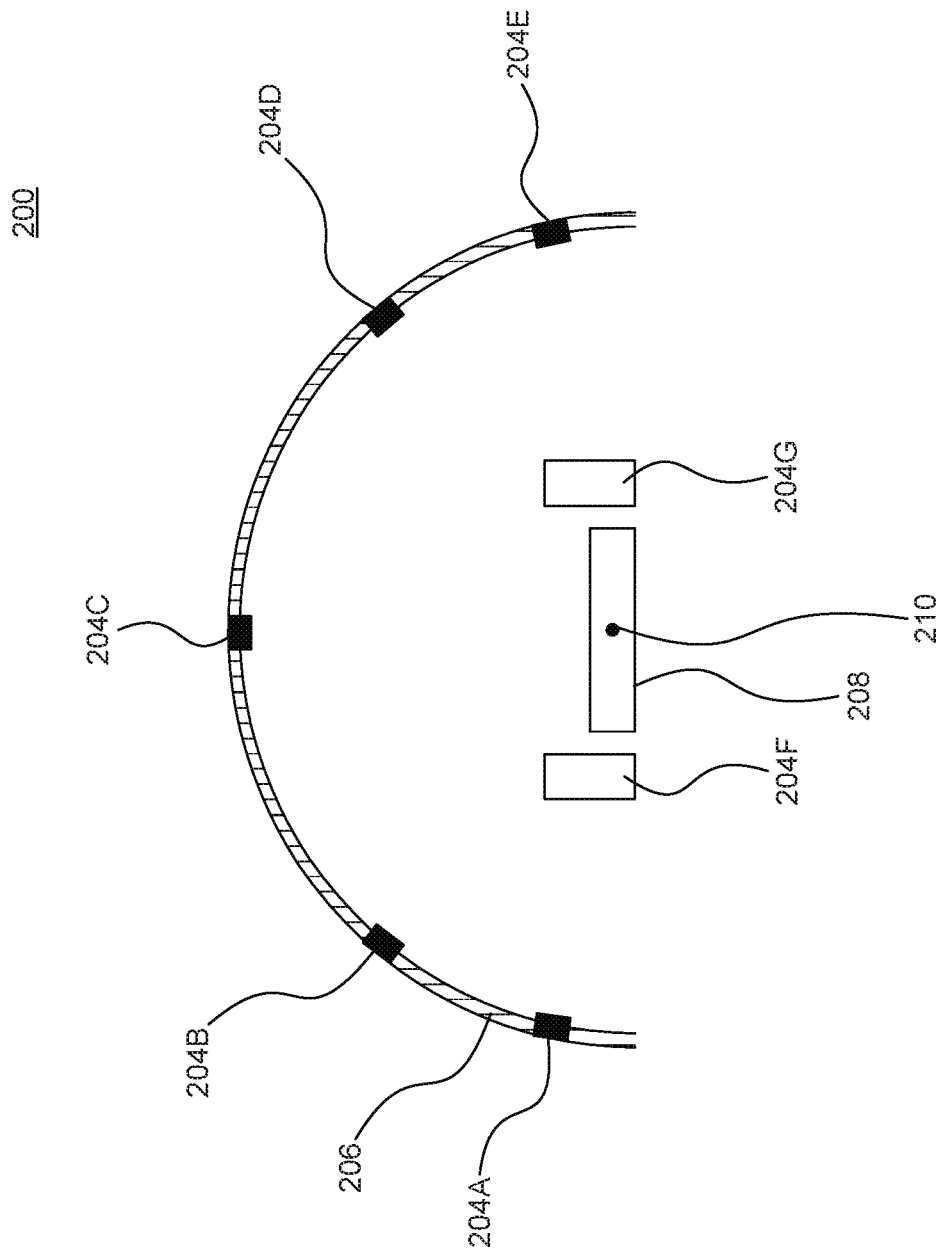

FIGS. 2A-B illustrate an example local venue 200. As illustrated in FIG. 2A, the local venue 200 may be shaped like a dome. As such, as shown in FIG. 2B, the local venue 200 may have an interior surface for providing audio sources 204A-E to provide audio. The interior surface may also provide display devices 206 to provide images. The display devices 206 may follow the shape of the interior surface and thus may also be curved. As such, the display devices 206 may provide a curved display and partially or surrounds local venue 200's attendees or seats. In doing so, the display devices 206 may surround venue 200's attendees or seats to provide them with an immersive view of image renderings. This may provide viewers with a full 360×180-degree view of the remote venue. The local venue 200 may include audio sources 204F-G, which may be arranged in an array and correspond to different portions of the image displayed via the display devices 206. The local venue 200 may further include a stage 204 for performers to perform. The backend server 102 and/or local servers 104A-B (of FIG. 1) may determine and utilize a middle point 210 of stage 204.

Referring back to FIG. 1, backend server 102's remote venue library 112 stores various remote venues that can be presented in the local venues 108A-B. The remote venue may be a real-world location or a fictitious location. The remote venue may be an outdoor venue or indoor value. As such, the remote venue may be a traditional venue that holds events (e.g., Times Square, Red Rocks Amphitheatre, The Gorge Amphitheatre, Hollywood Bowl, and Telluride park) or an untraditional venue that typically does not hold events (e.g., a beach, a park). Along these lines, the remote venue may be an atypical location for holding events, such as a location that does not permit events or people to enter. Some atypical locations include the Coliseum or Sistine Chapel in Rome, Italy, or Buckingham Palace in London, England, just to provide a few examples. Moreover, the remote venue may be smaller or larger than the local venue.

FIGS. 3A-B illustrates an example of remote venue 300. As illustrated in FIG. 3A, remote venue 300 may be a church and thus may be an untraditional venue that does not hold events. Thus, as shown in FIG. 3B, remote venue 300 may have an interior area 302 for presenting audio and/or video that has an interior surface 302 having a different shape and/or size than the interior surface of the local venue 200 (of FIG. 2B). Along these lines, remote venue 300 may also be composed of a different structure (e.g., concrete, wood, and stucco) than the local venue 200 (of FIG. 2B). Further, remote venue 300 may be in a different geographical location than local venue 200, which may result in different environmental considerations (e.g., humidity, weather condition, noise pollution, etc.). Any of the aforementioned factors may affect the reflectivity of audio waves provided in the remote venue 300 and thus affect the perception of audio at remote venue 300.

As such, prior systems were unable to accurately represent audio in remote venues 300 somewhat different than local venues 108A-B (of FIG. 1). In an attempt to do so, prior systems would acquire a single acoustic sample of the remote venue 300, typically at the center of the remote venue 300, and attempt to predict audio throughout the local venue 108A based on the single acoustic sample of the remote venue 300. However, prior systems did not account for the aforementioned factors unique to the remote venue. For example, prior systems did not account for the fact that audio waves may reflect in remote venue 300 differently. And for this reason, users at different locations of remote venue 300 may perceive audio differently.

Figure 4:
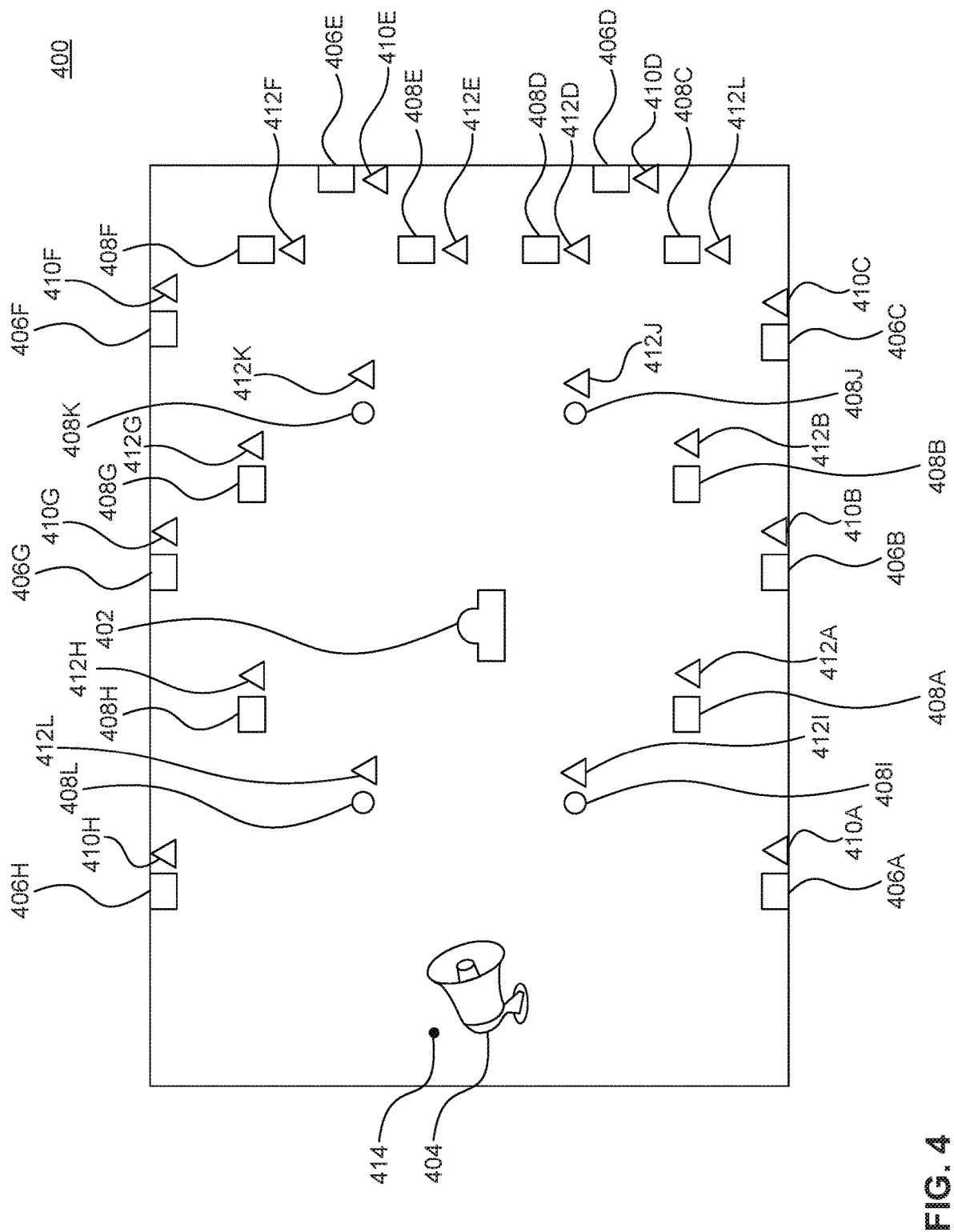
FIG. 4 illustrates a method of acquiring a virtual representation of the remote venue of FIGS. 3A-B, according to some embodiments.

To overcome these challenges, referring now to FIG. 1, backend server 102's spatialization engine 114 stores or creates a virtual representation of remote venue 300's interior area 302 (of FIG. 3B). FIG. 4 illustrates a method for acquiring the virtual representation of remote venue 400. The virtual representation includes an image portion and an audio portion. To derive the virtual representation's video portion, optical device 402 acquires images of remote venue 400. Optical device 402 may be a camera (e.g., a multi-camera array) and acquire single still images. As such, images may be acquired from a single point of view or multiple points of view.

Along these lines, optical device 402 may record a video of images to be replayed on local venue 200's display devices 206 (of FIG. 2B). For example, the optical device 402 may record a video of a beach having an ocean with splashing waves. This can be provided in the local venue 200 to provide the perception that they are on the beach.

As discussed above, local venue 200's display devices 206 (of FIG. 2B) may provide a 360-degree perception of remote venue 400. As such, images may be acquired from different angles and locations to permit an attendee at each possible location in local venue 200 to view an appropriate portion of the remote venue 400. For example, if one attendee is in the back corner and another attendee is in the front, opposing corner of remote venue 400, the attendee in the back corner will have a different view than the attendee in the front, opposing corner of remote venue 400.

Although remote venue 200 may be a building having a closed interior, remote venue 400 may be completely in the open (e.g., on a beach) or partially exposed to the outside (e.g., without a roof). Accordingly, where remote venue 400 is partially exposed to the outside, images are acquired at all locations and angles such that all attendees in local venue 200 (of FIG. 2B) view the appropriate portions of remote venue 400 and the outside. And, where remote venue 400 is completely in the open, a user of user devices 106A-B (of FIG. 1) first defines an area to acquire the fingerprint. Thereafter, images are acquired at all locations and angles such that all attendees in local venue 200 (of FIG. 2A-B) view the appropriate portions of remote venue.

To acquire the virtual representation's audio portion, backend server 102's spatialization engine 114 (of FIG. 1) determines reverberations at various locations throughout the remote venue 400. To do so, spatialization engine 114 derives an origin point 414, reflection points 406, and reverberation points 408A-L in remote venue 400 to determine reverberations. Origin point 414 corresponds to middle point 210 of local venue 200's stage 208 (of FIG. 2B) or another predetermined point in local venue 200. Audio source 404 is then placed origin point 414. Audio generator 310 may be a pistol or a form of audio, just to provide an example.

Reflections points 406A-H are points in the remote venue 400 that reflect audio. As such, an authorized user of user devices 106A-B (of FIG. 1) may be select reflection points, for example, based on the interior region of the remote venue. Thus, if the remote venue has a unique interior portion, a reflection point 406A-H may be provided thereon. Moreover, reflection points 406 may be based on the location of audio sources 204A-E in local venue 200 (of FIG. 2B). As such, the locations of reverberation points 408A-L in the remote venue 400 may correspond to locations of audio sources 204A-E in local venue 200. In turn, the number reverberation points 408A-L in remote venue 400 may correspond to the number of audio sources 204A-E in local venue 200. Further, an optimal number of reflection points 406 may be selected based on the location and/or the size of the local venue.

Reverberation points 408A-L are placed a distance away from reflection points 406A-H. An authorized individual may preselect the distance, which may be based on the size of the remote venue. In some embodiments, where the remote venue 400 is smaller than the local venue 200 (of FIG. 2B), reverberation points 408A-L in remote venue 400 may be less than the number of audio sources 204A-E (of FIG. 2B) in the local venue 200. Further, where the remote venue 400 is smaller than the local venue 200, a single reverberation point 408A-L of remote venue 400 may correspond to multiple audio sources 204A-E. Moreover, where the remote venue 400 is larger than local venue 200, reverberation points 408A-L of remote venue 400 may be greater than the number of audio sources 204A-E in local venue 200.

Accordingly, first audio receivers 410A-H (e.g., microphones) are placed at or near reflection points 406A-H in remote venue 400. And, second audio receivers 412A-L (e.g., microphones) are placed at or near reverberation points 408A-L in remote venue 400. Audio source 404 then provides audio and audio receivers 410A-H/412A-L at reflection and reverberation points 406A-H/408A-L receives the audio. As such, for each respective reflection point 406A-H, the associated audio receivers 410A-H/412A-L may receive audio from audio source 404.

In some embodiments, the effect of the reflection points 406A-H may be detected collectively. For example, first and second audio receivers 410A-H/412A-L may receive the audio provided by audio source 404 at the same time. In some embodiments, the effect of the reflection points 406A-H may be determined individually. For example, for reflection point 406A, associated first and second audio receivers 410A/412A receive audio from audio source 404. Thereafter, for each reflection point 406B-H, associated first and second audio receivers 410B-H/412B-H received audio from audio source 404 sequentially. However, as discussed above, depending on the size of the remote venue with respect to the local venue, additional second audio receivers 412A-L may correspond to the same reflection point 406A or first audio receiver 412A-L.

Along these lines, audio source 404 may provide audio in multiple predetermined directions in remote venue 400. For example, when the effect of the reflection points 406A-H is determined collectively and thus first and second audio receivers 410A-H/412A-L receives audio from audio source 404 at the same time, the audio source 404 may be directed sequentially at each of the reflection points 406A-H. Alternatively, when the effect of the reflection points 406A-H is determined individually and variously associated first and second audio receivers 410A/412A receive audio from audio source 404 at different times, the audio source 404 may be directed at the reflection point 406A-H so that the reflection points 406A-H may be analyzed. For example, if reflection point 406A is being analyzed, the audio source 404 may be directed at reflection point 406A. As such, this may be performed sequentially for each of the remaining reflection points 406B-H.

Moreover, audio source 404 may provide audio at different sound pressure levels (SPL) within a predetermined frequency range (e.g., from 20 Hz to 20 kHz). Furthermore, audio source 404 may be moved to different locations in the remote venue 400. As such, audio receivers 410A-H/412A-L at reflection points 406A-H and reverberation points 408A-L throughout remote venue 400 may receive audio from an audio source 404 at different locations and different SPLs.

Along these lines, while deriving the reverberations, environmental audios unique to the remote venue may be derived and recorded at the reverberation points 408A-L. Examples of environmental audio include waves breaking and seagulls at a beach, echoing footsteps in a church, and wind and rustling leaves in the outdoors, just to provide a few examples.

The spatialization engine 114 (of FIG. 1) then determines or measures reverberations at each reverberation point 408A-L in remote venue 400 and SPL provided by audio source 404. As understood by a person of ordinary skill in the art, reverberation refers to the persistence of audio after the audio is produced and includes a time required for the audio to fade away. Reverberation time of the remote venue 400 is based on real-world characteristics of remote venue 400, such as an architectural design (e.g., size, shape, and materials) of remote venue 400 and objects (e.g., water, mountains, furniture, building structure) in or around remote venue 400, just to provide a few examples. As such, the reverberations in remote venue 400 are unique to remote venue 400. Thus, the reverberations for the reverberation points may include different delays and/or frequency-dependent level variations, depending on the remote venue 400 and the location in the remote venue 400.

The spatialization engine 114 (of FIG. 1) also may create a virtual representation of remote venue 400, optionally after deriving the reverberations for the reverberation points 408A-L. As the remote venue is three-dimensional, the virtual representation may also be three-dimensional. As such, where remote venue 400 is an indoor venue having structural portions, the virtual presentation may depict various structural portions of the indoor venue. In turn, some of these structural portions of remote venue 400 may be different than corresponding structural portions of local venue 108A-B (of FIG. 1). Thus, reflection points 406A-H and second audio receiver 412A-L may be provided at structural portions of remote venue 400 different than corresponding structural portions of local venues 108A-B.

Figure 5:
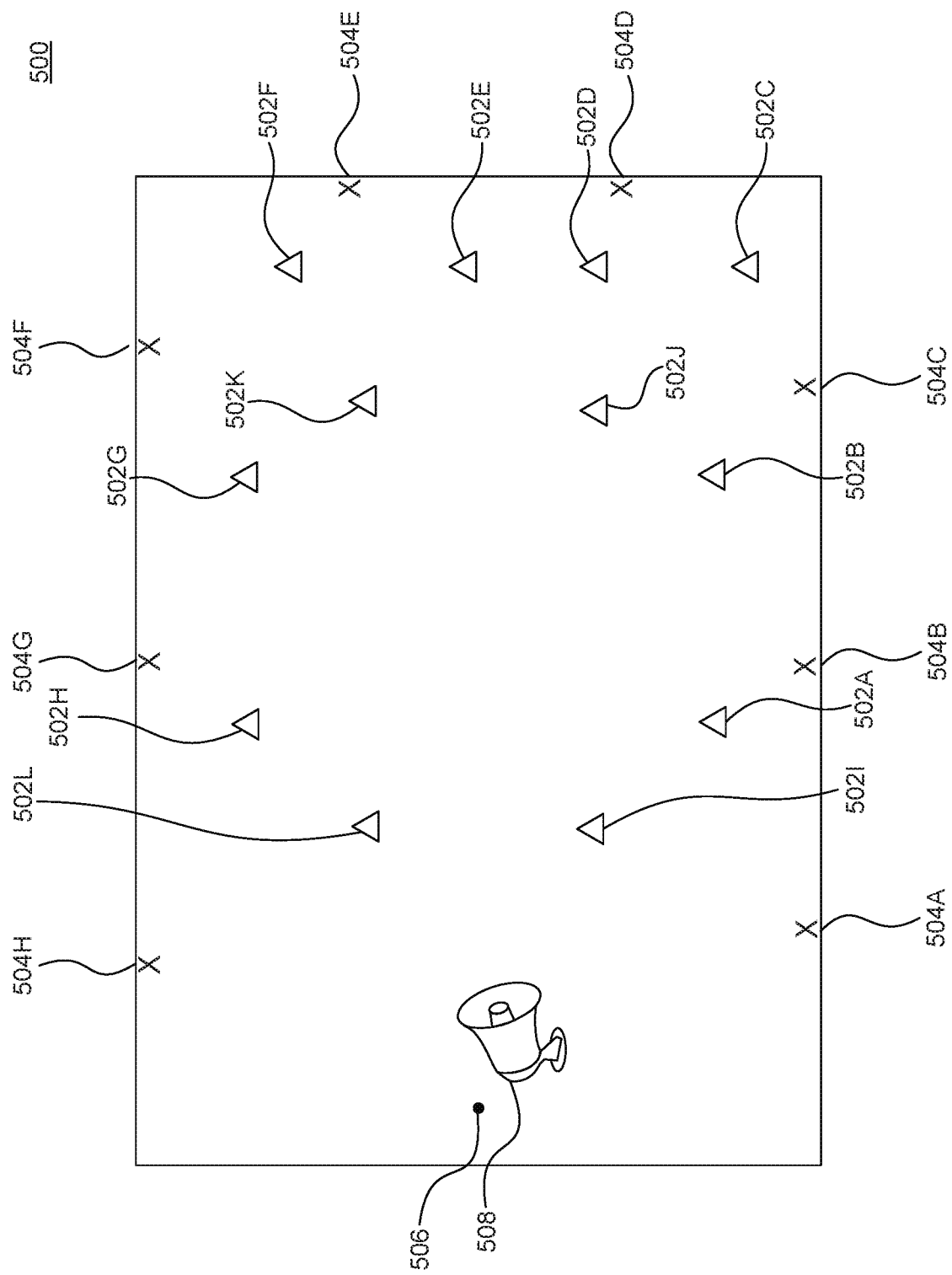
FIG. 5 illustrates the virtual representation derived from the method of FIG. 4, according to some embodiments.

FIG. 5 illustrates an example of virtual representation 500 of remote venue 400 (of FIG. 4). Virtual representation 500 includes virtual reverberation points 502A-L, virtual speakers 504A-H, a virtual origin point 506, and a virtual audio source 508. Virtual reverberation points 502A-L correspond to reverberation points 408A-L (of FIG. 4) and reverberations determined by spatialization engine 114 (of FIG. 4) relating to the reverberation points 408A-L as discussed above. As such, virtual reverberation points 502A-L may have a three-dimensional position in the virtual representation corresponding to the reverberation points 408A-L in the remote venue 400.

Virtual audio sources 504A-L correspond to local venue 200's audio sources 204A-E (of FIG. 2B). Although not illustrated in these figures, the number of virtual audio sources 504A-L equals the number of audio sources 204A-E. As such, the virtual audio sources 504A-L may have a three-dimensional location in the virtual representation 500 of the remote venue that corresponds to the three-dimensional location of the local venue 200's audio sources 204A-E. For example, the virtual audio sources 504A-L may have the same spatial relationship with respect to the virtual origin point 506 in the virtual representation as to the audio sources 204A-E with respect to the middle point 210 of local venue 200's stage 208 (of FIG. 2B) or predetermined point in local venue 200.

Virtual origin point 506 corresponds to the same middle point 210 of local venue 200's stage 208 (of FIG. 2B), or the same predetermined point in local venue 200, as origin point 414 (of FIG. 4). Virtual audio source 508 corresponds to an audio source provided in local venue 200, which may be part of a prerecorded video or a live performer. Accordingly, virtual audio source 508 moves in the virtual representation based on the movement of the audio source in the prerecorded video or live performance.

As such, the virtual audio source 508 may transverse and rotate in the virtual representation 500 based on the movement of the audio source in the local venue. For example, if the audio source moves left to right in the local venue, the audio source 508 may move accordingly in the virtual representation. Moreover, if the audio source rotates 30 degrees in a certain direction in the local venue, the audio source 508 may rotate accordingly in the virtual representation.

Along these lines, the virtual audio source 508 may change size in the virtual representation 500 based on a degree of focus of a video camera recording images of the audio source of the local venue. As such, based on the size of the virtual audio source 508 in the virtual representation 500, the audio reproduced by the virtual audio source 508 may be modified accordingly. For example, if the video camera focuses on the audio source such that the audio source is depicted at two times a normal magnification level, the virtual audio source 508 may be doubled in size and reproduce audio twice as loud, relative to other audio sources, as normal in the virtual representation 500. Conversely, if the video camera expands the field of view such that the magnification level is half of the normal magnification level, the virtual audio source 508 may be half of its normal size and reproduced audio half as loud, relative to other audio sources, as normal in the virtual representation 500.

As such, the virtual representation 500 incorporates reverberation points 502A-L determined in the real-world remote venue 400 (of FIG. 4) and replications of properties of the audio sources in the local venue 200 (of FIG. 2B).

Figure 6:
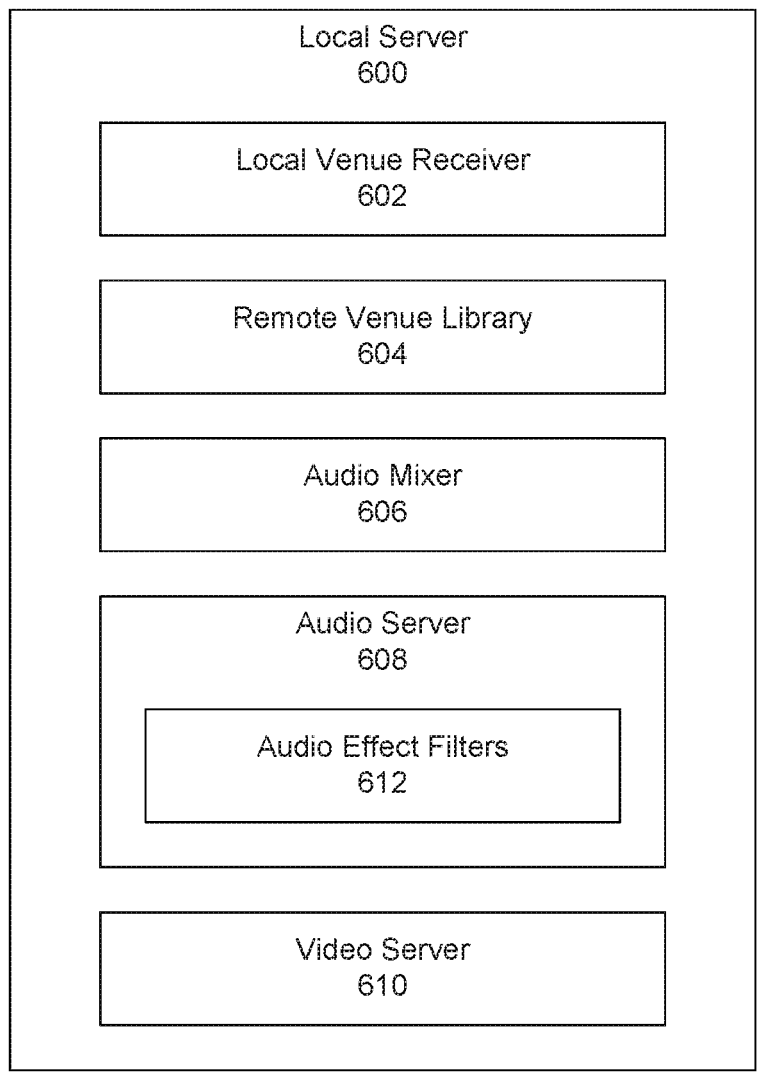
FIG. 6 illustrates an example local server of FIG. 1, according to some embodiments.

Referring back to FIG. 1, local servers 104A-B may provide the audio and video to the local venue 108A-B's display devices 118A-B and audio sources 120A-B, respectively. FIG. 6 illustrates an example of local server 600 of the local venues 108A-B (of FIG. 1). Local server 600 includes the local venue receiver 602, remote venue library 604, audio mixer 606, audio server 608, and video server 610. Like backend server 102's local venue receiver 110 (of FIG. 1), local venue receiver 602 stores dimensions of an interior portion of the local venues 108A-B providing the audio presentation, a configuration and location of audio sources 120A-B in local venues 108A-B (of FIG. 1), a location of a stage (or where a performer typically performs) in local venues 108A-B, and/or a location of possible attendees (e.g., seats) in local venues 108A-B. As such, local venue receiver 602 may store a distance between audio sources 112A-B in the local venues 108A-B, a distance from each audio source 120A-B to the stage in the local venue 108-B.

Also like backend server 102's remote venue library 112 (of FIG. 1), remote venue library 604 stores audio and video of various remote venues that can be presented in the local venues 108A-B (of FIG. 1). Remote venue library 604 also stores virtual representations for the remote venues.

Audio mixer 606 receives live audio from a local venue. As such, the audio mixer 606 may receive prerecorded audio provided in the local venue 200. Alternatively, the audio mixer 606 may receive audio from a live performer in the local venue 200. In some embodiments, as described above, the audio mixer 606 receives audio from multiple live performers in the local venue.

Audio server 608 comprises audio effect filters 612 to mirror the reverberation points of the remote venues. The audio effect filter 612 may be based on the virtual representation of the remote venues. Accordingly, the audio effect filters 612 identify reverberations for different portions of the remote venue based on the corresponding reverberation points in the virtual representation of the remote venue. The audio effect filters 612 then applies the reverberations of the different portions of the remote portion so that audio having the reverberations can be replayed in corresponding portions of the local venue, thereby allowing the local venue to replicate the remote venue acoustically.

Video server 610 receives an image or video of the remote venue from the remote venue library 604 and/or from the local venue.

Figure 7:
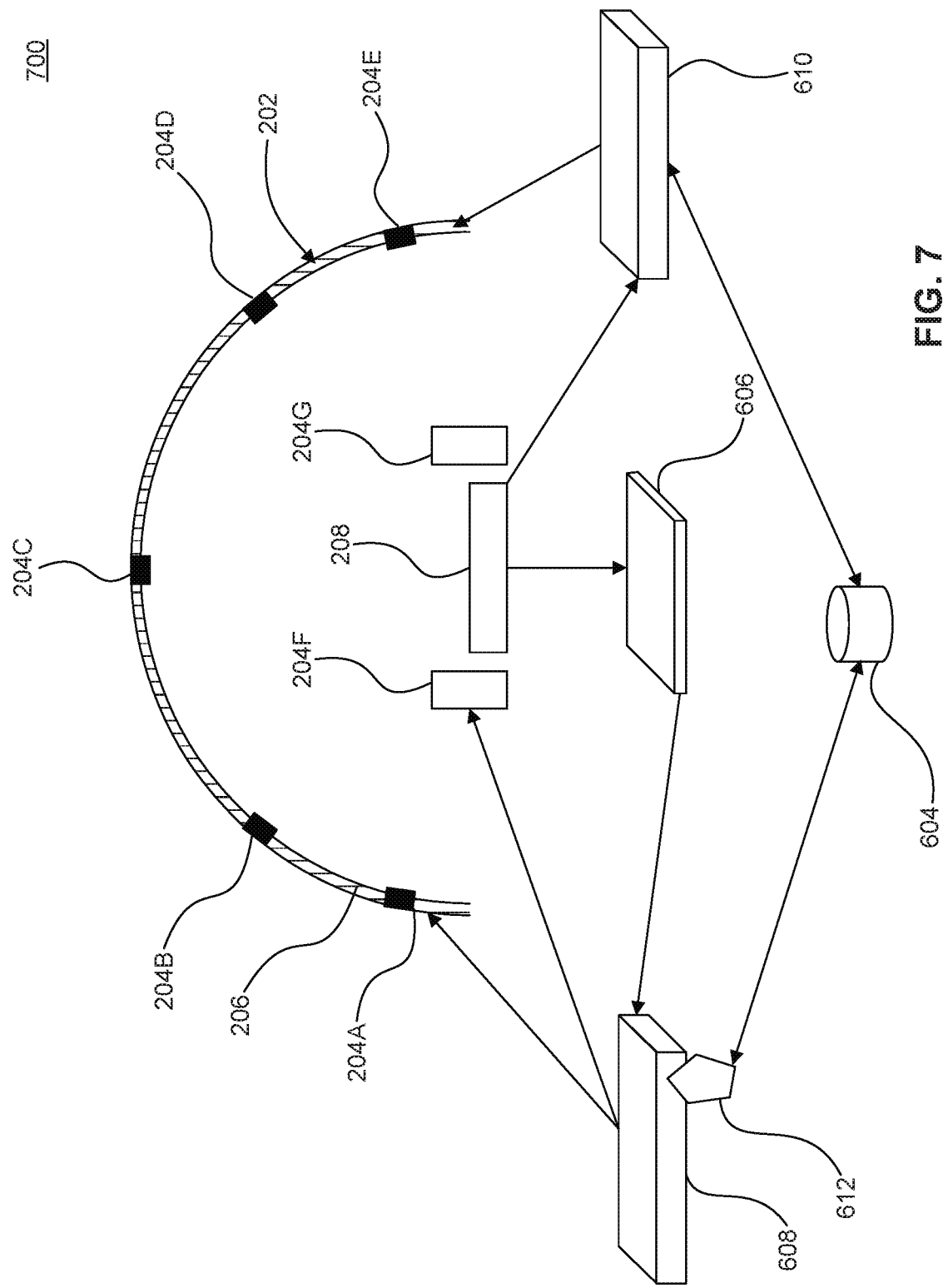
FIG. 7 illustrates an example block diagram of the components of the local server of FIG. 6 that provide audio and video of a remote venue to the local venue of FIGS. 2A-B, according to some embodiments.

FIG. 7 illustrates an example block diagram of the components of the local server 600 (of FIG. 6) providing audio and video of a remote venue to local venue 200 (of FIGS. 2A-B). As described above, local venue 200 may be shaped like a dome. As such, the local venue 200 may have an interior surface for providing audio sources 204A-E to provide audio. The interior surface may also provide display devices 206 to provide images. The display devices 206 may follow the shape of the interior surface and thus may also be curved. As such, the display devices 206 may provide a curved display and partially or surrounds local venue 200's attendees or seats, thereby providing viewers with a full 360×180-degree view of the remote venue. The local venue 200 may include audio sources 204F-G, which may be arranged in an array and correspond to different portions of the image displayed via the display devices 206. The local venue 200 may further include a stage 204 for performers to perform.

As such, audio server 608 receives the virtual representation of the remote venue 200 from the remote venue library 604. Audio server 608 derives audio effect filters 612 based on the reverberation points in the virtual representation of the remote venue 200.

Audio server 608 also receives audio from audio mixer 606, which receives audio from local venue 200. Audio server 608 determines reverberations for audio sources 204A-G of the local venue based on the audio effect filters 612 of the remote venue. As such, audio sources 204A-G of the local venue 200 may provide audio to attendees replicating audio that the attendees would hear in corresponding areas in the remote venue. For example, if audio sources 204A/E provide audio to a first and second area of local venue 200 that corresponds to a first and second area of the remote venue, audio sources 204A/204E provide modified audio to the first and second portions of local venue 200 having reverberations. The modified audio corresponds to audio provided in the first and second portions of the remote venue. Along these lines, the audio sources 204A/204E may provide different reverberations.

As stated above, the video server 610 receives images of the remote venue from the remote venue library 604 and/or images from the local venue 200 to provide them on the domed video screen of the local venue in such a fashion that the images partially or surround the attendees in the local venue. As such, as stated above, the video server 610 may provide the attendees with an immersive view of the remote venue.

Moreover, video server 610 may receive additional images from the local video. For example, video server 610 may receive live images of individuals performing at the local venue (e.g., musicians, comedians, etc.) Alternatively, video server 610 may receive prerecorded images of a previously recorded video (e.g., a movie).

Accordingly, video server 610 may map the additional images from the local video onto the images of the remote venue differently whether the additional images were live or prerecorded images. For example, if the additional images are live images, video server 610 may identify an audio source in the live images to map onto the images of the remote venue. Video server 610 may then determine the location of the audio source based on a predetermined location of the local venue (e.g., a middle point 210 of stage 204 of FIG. 2). And based on the corresponding predetermined location in the virtual representation of the remote venue, video server 610 determines an appropriate location in the images of the remote venue to present the additional images. However, if the additional images are prerecorded images, video server 610 may map the additional images onto the images of the remote venue in a predetermined location, such as a location allowing all attendees of the local venue to view the additional images.

As such, the video server 610's images may include audio sources (e.g., live performers or of a movie) in local venue 200. The video server 610's images may also be part of a prerecorded video (e.g., a movie) provided in the local venue. Accordingly, the video server 610's images may depict an audio source moving and continually modify the images to present the virtual representation of the audio source more accurately.

Along these lines, the video server 610 provides different images of the remote and local venues to the appropriate portions (e.g., a first and second portion) of the local venue 200's display devices 206 so that an accurate visual representation of the remote venue is provided in the local venue and how the additional images would be provided in the remote venue. And, as noted above, the audio server 608 provides different modified portions of the original audio (e.g., a first and second modified portion) to the appropriate local venue 200's audio sources 204A-G so that an accurate acoustic representation is provided in the local venue 200. Accordingly, the audio and video servers 608/610 may send the images and modified streams of audio synchronously fashion, for example, by being based on a time sequence.

Referring back to FIG. 1, as discussed above, backend server 102 may further include the convolution engine 116. Convolution engine 116 performs the functions of the local server 104A-B. As such, convolution engine 116 may determine a view of images presented by the display devices 118 of the local venues 108A-B at various locations in the local venues 108A-B. Similarly, convolution engine 116 may determine a location of audio provided by audio sources 120A-B of the local venues 108A-B at various locations in the local venues 108A-B.

As such, via backend server 102's convolution engine 116, user devices 106A-B permit authorized users to review imagery and/or receive audio at different locations in the local venues 108A-B. Along these lines, user devices 106A-B may also permit simulation and/or modeling of remote locations to be presented in local venues 108A-B. The simulation may permit an authorized user to view and/or edit the processing performed by the convolution engine 116 in creating the replication of the remote. As such, the simulation may permit an authorized user to edit one or more inputs of the convolution engine, such as reverberations at various audio points in the virtual representation. Moreover, the modeling may permit an authorized user to view imagery and/or listen to audio from predefined points in the venue. The authorized users may then make any suitable modifications to the imagery and/or audio for each predefined point. For example, the authorized user may modify the reverberation of audio, the location of imagery on display devices, and/or mapping of the audio to the imagery. Thus, user devices 106A-B may be in the form of headphones, a display device, and/or a virtual reality headset, just to name a few examples.

Figure 8:
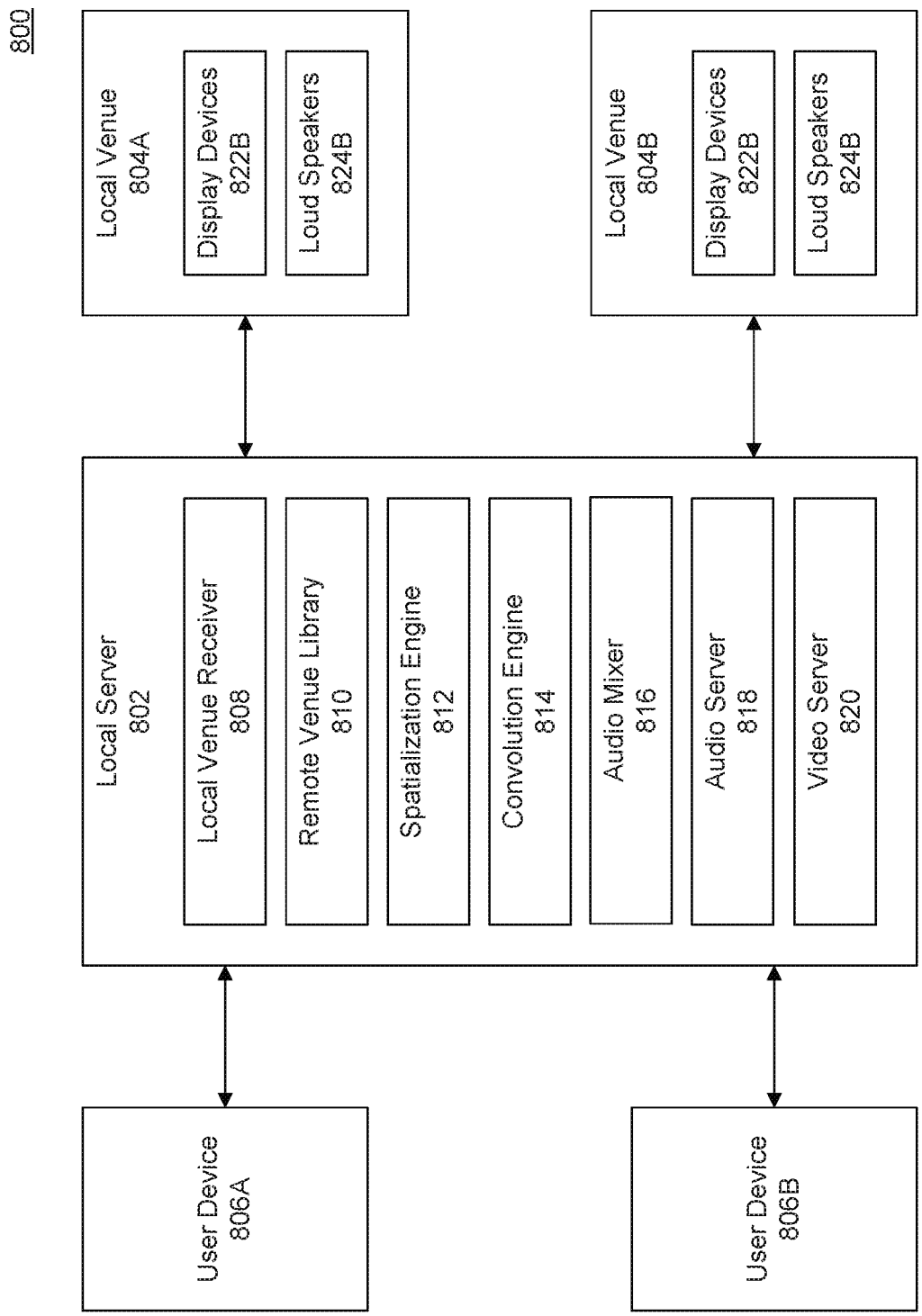
FIG. 8 illustrates a block diagram of an alternative system for providing a representation of a remote venue in a local venue, according to some embodiments.

FIG. 8 illustrates an alternative system 800 for providing an audio and video representation of a remote venue in a local venue 804A-B. System 800 includes backend server 802 in communication local venues 804A-B and user devices 806A-B. In contrast to system 100 of FIG. 1, system 800 does not include local servers 104A-B. Rather, backend server 802 acts as a single server for backend server 102 and local servers 104A-B (of FIG. 1). As such, like backend server 102 (of FIG. 1A), backend server 802 includes local venue receiver 808, remote venue library 810, spatialization engine 812, and convolution engine 814. However, in addition, backend server 802 also includes the additional components of local server 600 (of FIG. 6). As such, backend server 102 further includes audio mixer 816, audio server 818, and video server 820.

Figure 9:
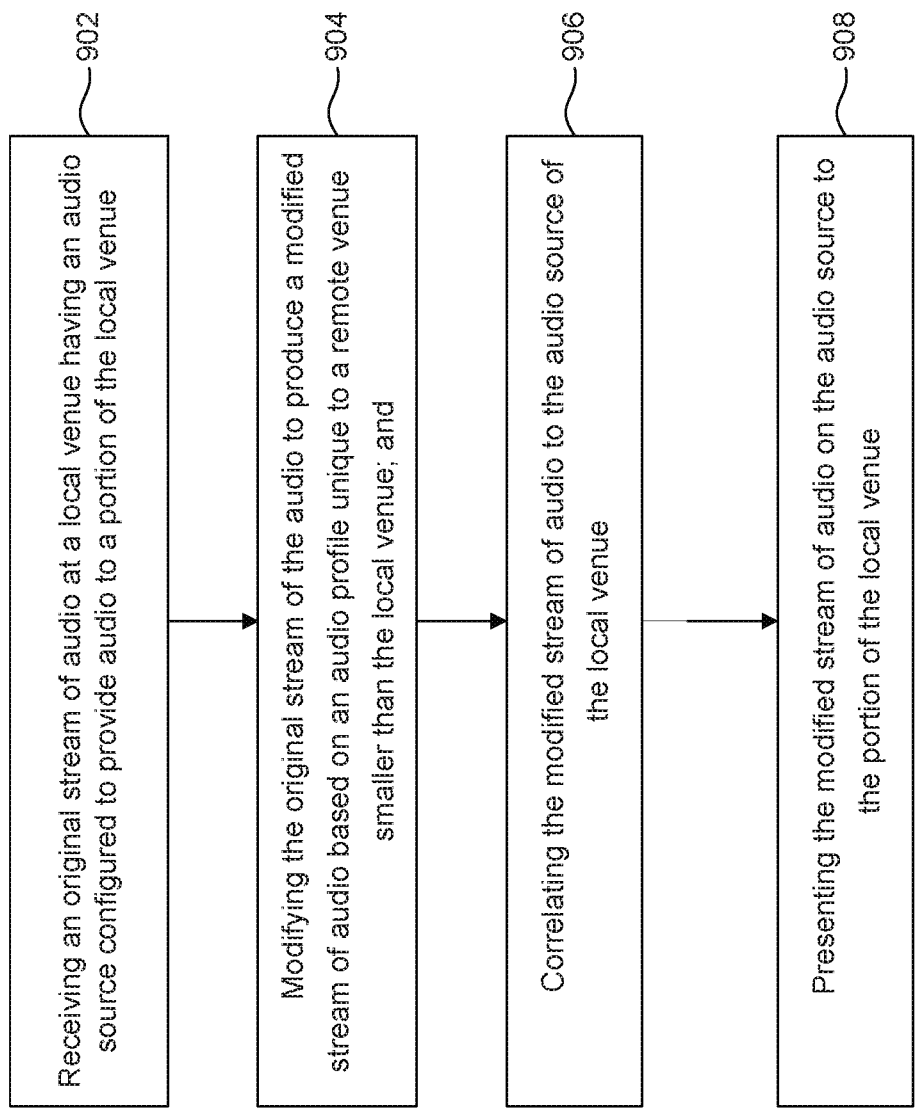
FIG. 9 illustrates a flowchart of an example method for providing a replication of a remote location in a venue, according to some embodiments.

FIG. 9 illustrates a flowchart of a method of replicating a remote venue in a local venue, according to some embodiments. Methods 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 9, as will be understood by a person of ordinary skill in the art.

Referring now to FIG. 9, method 900 shall be described with reference to FIGS. 1 and 3A-B. However, method 900 is not limited to those example embodiments.

In 902, the backend server 102 receives an original stream of audio from a first audio source at a local venue 108A, wherein the local venue 108A has a display device and a first and second audio source.

In 904, the backend server 102 identifies a prestored image of a remote venue 300 to project in the local venue 108A, wherein the prestored image comprises a first and second portion corresponding to a first and second portion of the remote venue 300, respectively.

In 906, the backend server 102 identifies a virtual representation of the remote venue 300, wherein the three-dimensional virtual representation is configured to modify audio based on the first and second portions of the remote venue 300.

In 908, the backend server 102 modifies the original stream of audio to produce a first and second modified stream of audio based on the virtual representation of the remote venue 300, wherein at least one of the first and second modified streams of audio is different from the original stream of audio.

In 910, the backend server 102 correlates the first and second modified streams of audio to the first and second portions of the prestored image of the remote venue 300.

In 912, the backend server 102 presents the prestored image on the display device 118A of the local venue 108A such that the first and second portions of the prestored image of the remote venue 300 are presented to a first and second region of the local venue 108A, respectively.

In 914, the backend server 102 presents the first and second modified streams of audio on the first and second audio sources of the local venue 108A, respectively, such that the first and second modified streams of audio are provided to the first and second regions of the local venue 108A synchronously.

Figure 10:
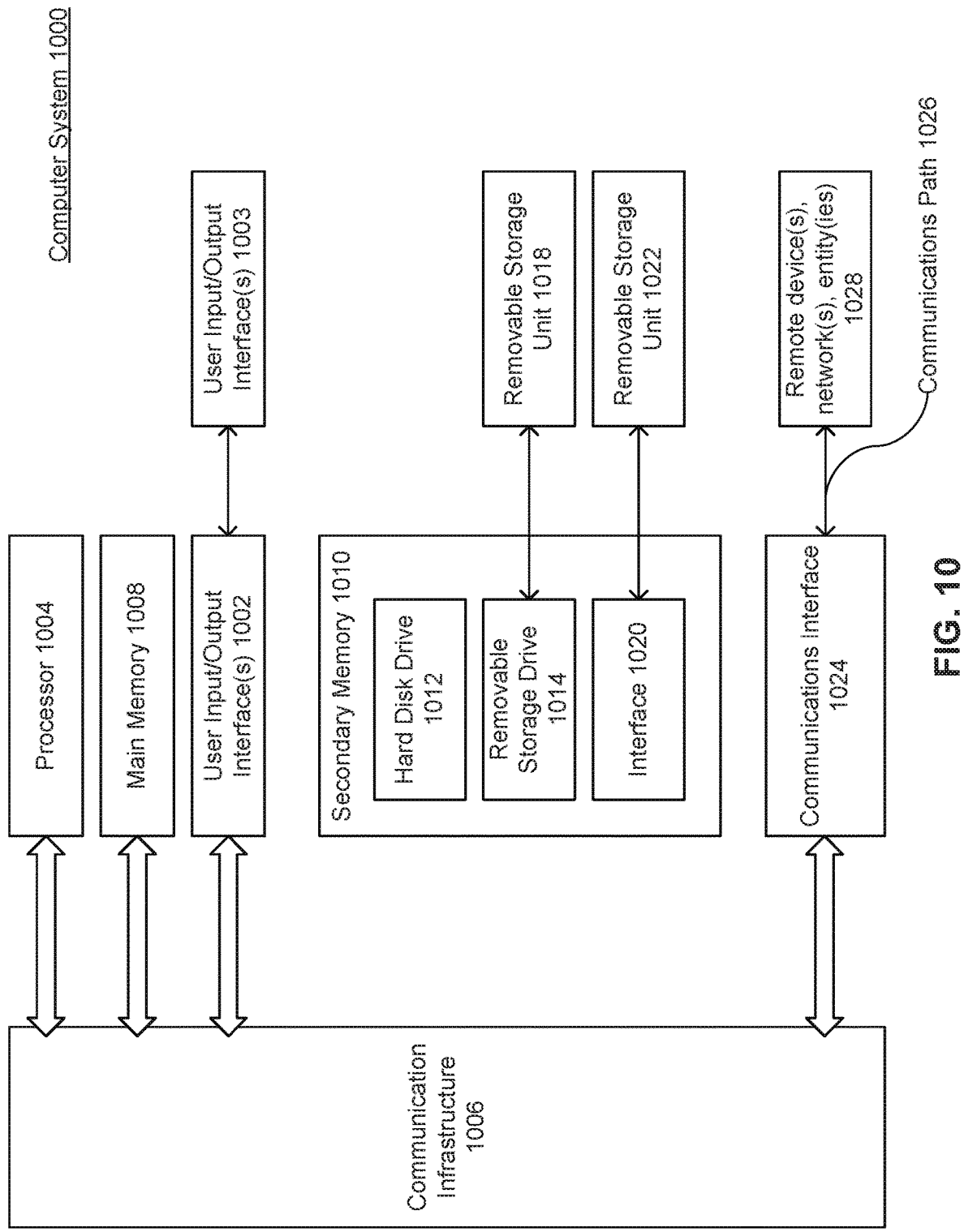
FIG. 10 illustrates an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more processors 1004 may be a graphics processing unit (GPU). In an embodiment, a GPU may be a processor that is a specialized electronic circuit designed to process mathematically intensive applications. The GPU may have a parallel structure that is efficient for processing of large blocks of data simultaneously (in parallel as opposed to serially), such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer-usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to a removable storage unit 1018.

Secondary memory 1010 may include other means, devices, components, instrumentalities or other approaches for allowing computer programs and/or other instructions and/or data to be accessed by computer system 1000. Such means, devices, components, instrumentalities, or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived either extemporaneously or from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for replicating a remote venue onto a local venue, the computer-implemented method comprising:
   retrieving, by a computing device, a virtual representation of the remote venue, the virtual representation including a first property of a sound at a first location within the remote venue and a second property of the sound at a second location within the remote venue,
   identifying, by the computing device, a first audio device within the local venue that corresponds to the first location within the remote venue and a second audio device within the local venue that corresponds to the second location within the remote venue;
   modifying, by the computing device, an input audio stream within the local venue in accordance with the first property and the second property to provide a first output audio stream and a second output audio stream, respectively;
   retrieving, by the computing device, an image of the remote venue;
   identifying, by the computing device, a first portion of a display device within the local venue to display a first portion of the image of the remote venue and a second portion of the display device to display a second portion of the image of the remote venue;
   correlating, by the computing device, the first output audio stream to the first portion of the image of the remote venue to synchronize the first output audio stream and the first portion of the image of the remote venue and the second output audio stream to the second portion of the image of the remote venue to synchronize the second output audio stream and the second portion of the image of the remote venue;
   providing, by the computing device, the image of the remote venue to the display device of the local venue such that the first portion of the image of the remote venue and the second portion of the image of the remote venue are a displayed by the first portion of the display device to a first region of the local venue and the second portion of the display device to a second region of the local venue, respectively; and
   providing, by the computing device, the first output audio stream and the second output audio stream to the first audio device and the second audio device, respectively, such that the first output audio stream is presented to the first region of the local venue synchronously with the first portion of the image of the remote venue and the second output audio stream is presented to the second region of the local venue synchronously with the second portion of the image of the remote venue.

2. The computer-implemented method of claim 1, further comprising:
   selecting, by the computing device, a remote venue from among a plurality of remote venues that are capable of being represented in the local venue from a remote venue library, the remote venue library including a plurality of virtual representations and a plurality of images corresponding to the plurality of remote venues,
   wherein the retrieving the virtual representation of the remote venue comprises retrieving the virtual representation of the remote venue that is associated with the selected remote venue from among the plurality of virtual representations, and
   wherein the retrieving the image of the remote venue comprises retrieving the image of the remote venue that is associated with the selected remote venue from among the plurality of images.

3. The computer-implemented method of claim 1, wherein the first location within the remote venue and the second location within the remote venue comprise a first reverberation point and a second reverberation point, respectively,
   wherein the first property of the sound and the second property of the sound comprise a first reverberation of the sound from a first reflection point within the remote venue that is measured at the first reverberation point and a second reverberation of the sound from a second reflection point within the remote venue that is measured at the second reverberation point, respectively, and
   wherein the modifying comprises modifying the input audio stream within the local venue in accordance with the first reverberation of the sound and the second reverberation of the sound to provide the first output audio stream and the second output audio stream, respectively, to mirror the first reverberation of the sound and the second reverberation of the sound in the local venue.

4. The computer-implemented method of claim 3, wherein the first reverberation of the sound comprises a first delay and a first frequency-dependent level variation that are measured between the first reflection point and the first reverberation point, and wherein the second reverberation of the sound comprises a second delay and a second frequency-dependent level variation between the second reflection point and the second reverberation point.

5. The computer-implemented method of claim 1, wherein the modifying comprises:
   deriving, by the computing device, a first audio effect filter and a second audio effect filter in accordance with the first property and the second property, respectively, and
   applying by the computing device, the first audio effect filter and the second audio effect filter to the input audio stream to provide the first output audio stream and the second output audio stream, respectively.

6. The computer-implemented method of claim 1, wherein the retrieving the image of the remote venue comprises retrieving the image of the remote venue that is acquired from a plurality of points of view within the remote venue.

7. The computer-implemented method of claim 1, wherein the correlating comprises correlating the first output audio stream to the first portion of the image of the remote venue to synchronize the first output audio stream and the first portion of the image of the remote venue to a time sequence and the second output audio stream to the second portion of the image of the remote venue to synchronize the second output audio stream and the second portion of the image of the remote venue to the time sequence.

8. A system for replicating a remote venue onto a local venue, the system comprising:
   a memory configured to store instructions; and
   a processor configured to execute the instructions, the instructions when executed by the processor, configuring the processor to:
      retrieve a virtual representation of the remote venue, the virtual representation including a first property of a sound at a first location within the remote venue and a second property of the sound at a second location within the remote venue,
      identify a first audio device within the local venue that corresponds to the first location within the remote venue and a second audio device within the local venue that corresponds to the second location and a second audio device within the local venue that corresponds to the second location within the remote venue,
      modify an input audio stream within the local venue in accordance with the first property and the second property to provide a first output audio stream and a second output audio stream, respectively,
      retrieve an image of the remote venue,
      identify a first portion of a display device within the local venue to display a first portion of the image of the remote venue and a second portion of the display device to display a second portion of the image of the remote venue,
      correlate the first output audio stream to the first portion of the image of the remote venue to synchronize the first output audio stream and the first portion of the image of the remote venue and the second output audio stream to the second portion of the image of the remote venue to synchronize the second output audio stream and the second portion of the image of the remote venue,
      provide the image of the remote venue to the display device of the local venue such that the first portion of the image of the remote venue and the second portion of the image of the remote venue are displayed by the first portion of the display device to a first region of the local venue and the second portion of the display device to a second region of the local venue, respectively, and
      provide the first output audio stream and the second output audio stream to the first audio device and the second audio device, respectively, such that the first output audio stream is presented to the first region of the local venue synchronously with the first portion of the image of the remote venue and the second output audio stream is presented to the second region of the local venue synchronously with the second portion of the image of the remote venue.

9. The system of claim 8, wherein the instructions, when executed by the processor, further configure the processor to:
   select a remote venue from among a plurality of remote venues that are capable of being represented in the local venue from a remote venue library, the remote venue library including a plurality of virtual representations and a plurality of images corresponding to the plurality of remote venues;
   retrieve the virtual representation of the remote venue that is associated with the selected remote venue from among the plurality of virtual representations; and
   retrieve the image of the remote venue that is associated with the selected remote venue from among the plurality of images.

10. The system of claim 8, wherein the first location within the remote venue and the second location within the remote venue comprise a first reverberation point and a second reverberation point, respectively,
   wherein the first property of the sound and the second property of the sound comprise a first reverberation of the sound from a first reflection point within the remote venue that is measured at the first reverberation point and a second reverberation of the sound from a second reflection point within the remote venue that is measured at the second reverberation point, respectively, and
   wherein the instructions, when executed by the processor, configure the processor to modify the input audio stream within the local venue in accordance with the first reverberation of the sound and the second reverberation of the sound to provide the first output audio stream and the second output audio stream, respectively, to mirror the first reverberation of the sound and the second reverberation of the sound in the local venue.

11. The system of claim 10, wherein the first reverberation of the sound comprises a first delay and a first frequency-dependent level variation that are measured between the first reflection point and the first reverberation point, and
   wherein the second reverberation of the sound comprises a second delay and a second frequency-dependent level variation between the second reflection point and the second reverberation point.

12. The system of claim 8, wherein the instructions, when executed by the processor, configure the processor to:
   derive a first audio effect filter and a second audio effect filter in accordance with the first property and the second property, respectively, and
   apply the first audio effect filter and the second audio effect filter to the input audio stream to provide the first output audio stream and the second output audio stream, respectively.

13. The system of claim 8, wherein the instructions, when executed by the processor, configure the processor to retrieve the image of the remote venue that is acquired from a plurality of points of view within the remote venue.

14. The system of claim 8, wherein the instructions, when executed by the processor, configure the processor to correlate the first output audio stream to the first portion of the image of the remote venue to synchronize the first output audio stream and the first portion of the image of the remote venue to a time sequence and the second output audio stream to the second portion of the image of the remote venue to synchronize the second output audio stream and the second portion of the image of the remote venue to the time sequence.

15. A non-transitory computer-readable device having instructions stored thereon that, when executed by at least one computing device, cause the at least one computing device to perform operations for replicating a remote venue onto a local venue, the operations comprising:
retrieving a virtual representation of the remote venue, the virtual representation including a first property of a sound at a first location within the remote venue and a second property of the sound at a second location within the remote venue,
identifying a first audio device within the local venue that corresponds to the first location within the remote venue and a second audio device within the local venue that corresponds to the second location within the remote venue;
modifying an input audio stream within the local venue in accordance with the first property and the second property to provide a first output audio stream and a second output audio stream, respectively;
retrieving an image of the remote venue;
identifying a first portion of a display device within the local venue to display a first portion of the image of the remote venue and a second portion of the display device to display a second portion of the image of the remote venue;
correlating the first output audio stream to the first portion of the image of the remote venue to synchronize the first output audio stream and the first portion of the image of the remote venue and the second output audio stream to the second portion of the image of the remote venue to synchronize the second output audio stream and the second portion of the image of the remote venue;
providing the image of the remote venue to the display device of the local venue such that the first portion of the image of the remote venue and the second portion of the image of the remote venue are displayed by the first portion of the display device to a first region of the local venue and the second portion of the display device to a second region of the local venue, respectively; and
providing the first output audio stream and the second output audio stream to the first audio device and the second audio device, respectively, such that the first output audio stream is presented to the first region of the local venue synchronously with the first portion of the image of the remote venue and the second output audio stream is presented to the second region of the local venue synchronously with the second portion of the image of the remote venue.

16. The non-transitory computer-readable device of claim 15, wherein the operations further comprise:
selecting a remote venue from among a plurality of remote venues that are capable of being represented in the local venue from a remote venue library, the remote venue library including a plurality of virtual representations and a plurality of images corresponding to the plurality of remote venues,
wherein the retrieving the virtual representation of the remote venue comprises retrieving the virtual representation of the remote venue that is associated with the selected remote venue from among the plurality of virtual representations, and
wherein the retrieving the image of the remote venue comprises retrieving the image of the remote venue that is associated with the selected remote venue from among the plurality of images.

17. The non-transitory computer-readable device of claim 15, wherein the first location within the remote venue and the second location within the remote venue comprise a first reverberation point and a second reverberation point, respectively,
wherein the first property of the sound and the second property of the sound comprise a first reverberation of the sound from a first reflection point within the remote venue that is measured at the first reverberation point and a second reverberation of the sound from a second reflection point within the remote venue that is measured at the second reverberation point, respectively, and
wherein the modifying comprises modifying the input audio stream within the local venue in accordance with the first reverberation of the sound and the second reverberation of the sound to provide the first output audio stream and the second output audio stream, respectively, to mirror the first reverberation of the sound and the second reverberation of the sound in the local venue.

18. The computer-implemented method of claim 17, wherein the first reverberation of the sound comprises a first delay and a first frequency-dependent level variation that are measured between the first reflection point and the first reverberation point, and
wherein the second reverberation of the sound comprises a second delay and a second frequency-dependent level variation between the second reflection point and the second reverberation point.

19. The non-transitory computer-readable device of claim 15, wherein the modifying comprises:
deriving a first audio effect filter and a second audio effect filter in accordance with the first property and the second property, respectively, and
applying by the computing device, the first audio effect filter and the second audio effect filter to the input audio stream to provide the first output audio stream and the second output audio stream, respectively.

20. The non-transitory computer-readable device of claim 15, wherein the retrieving the image of the remote venue comprises retrieving the image of the remote venue that is acquired from a plurality of points of view within the remote venue.

21. The non-transitory computer-readable device of claim 15, wherein the correlating comprises correlating the first output audio stream to the first portion of the image of the remote venue to synchronize the first output audio stream and the first portion of the image of the remote venue to a time sequence and the second output audio stream to the second portion of the image of the remote venue to synchronize the second output audio stream and the second portion of the image of the remote venue to the time sequence.

\* \* \* \* \*

UNITED STATES PATENT AND TRADEMARK OFFICE
CERTIFICATE OF CORRECTION

PATENT NO. : 12,058,510 B2
APPLICATION NO. : 16/678792
DATED : August 6, 2024
INVENTOR(S) : Elby et al.

Page 1 of 1

It is certified that error appears in the above-identified patent and that said Letters Patent is hereby corrected as shown below:

In the Claims

In Column 14, Claim 1, Line 11, after "are" delete "a", therefor.

In Column 18, Claim 18, Line 38, delete "The computer-implemented method of claim" and insert --The non-transitory computer-readable device of claim--, therefor.

Signed and Sealed this
Twenty-fourth Day of September, 2024

Katherine Kelly Vidal
*Director of the United States Patent and Trademark Office*